United States Patent [19]
Setzer et al.

[11] Patent Number: 5,640,056
[45] Date of Patent: Jun. 17, 1997

[54] ADJUSTING DEVICE HAVING A MULTI-FUNCTIONAL OPERATING SWITCH

[75] Inventors: Juergen Setzer, Illingen; Volker Wilhelmi, Esslingen; Gerhard Nagel, Nufringen, all of Germany

[73] Assignee: Mercedes-Benz AG, Stuttgart, Germany

[21] Appl. No.: 598,267

[22] Filed: Feb. 7, 1996

[30] Foreign Application Priority Data

Feb. 7, 1995 [DE] Germany ............ 195 03 920.3

[51] Int. Cl.⁶ ............................................. B60L 1/00
[52] U.S. Cl. ............................. 307/10.1; 364/424.045
[58] Field of Search ............................. 307/9.1, 10.1, 307/112, 114; 180/271, 281, 286; 364/424.01, 424.05; 219/202; 62/3.61

[56] References Cited

U.S. PATENT DOCUMENTS

| | | | |
|---|---|---|---|
| 4,857,813 | 8/1989 | Matsumoto et al. | 318/54 |
| 5,019,759 | 5/1991 | Takemura et al. | 364/424.05 |
| 5,208,483 | 5/1993 | Reneau | 307/10.1 |
| 5,525,844 | 6/1996 | Doolittle, III et al. | 307/10.1 |

FOREIGN PATENT DOCUMENTS

| | | |
|---|---|---|
| 2640528 | 3/1978 | Germany. |
| 3609688 | 9/1986 | Germany. |
| 4017895 | 11/1991 | Germany. |
| 4128306 | 3/1993 | Germany. |

Primary Examiner—Richard T. Elms
Attorney, Agent, or Firm—Evenson, McKeown, Edwards & Lenahan, P.L.L.C.

[57] ABSTRACT

An adjusting device having a multi-function operating switch is provided. The function elements which can be controlled by the operating switch can be selected in a variable manner on the user side from a totality of function elements. In a motor vehicle, the operating switch may, for example, have the configuration of a tunnel driving switch by which function elements that can be selected by the user, such as window lifting mechanisms, low-beam and interior-light units, etc. can be controlled into function positions which can also be predetermined by the user for driving through tunnels. This implements a high operating comfort for the individual and situation-adapted adjustment of a condition which can be influenced by a totality of function elements.

12 Claims, 2 Drawing Sheets

ADJUSTING DEVICE HAVING A MULTI-FUNCTIONAL OPERATING SWITCH

BACKGROUND AND SUMMARY OF THE INVENTION

This invention relates to an adjusting device having an operating switch by means of which several function elements can be simultaneously controlled into a respective function position which can be predetermined in a variable manner by the user. Each of the several function elements can be controlled into different function positions. Through the use of a single control operation of such a multi-function operating switch, several function elements may therefore be brought jointly into a desired function position for the respective function element.

Such adjusting devices are used, for example, by the user for the individual adjustment of the adjustable function elements of a vehicle. Thus, a control device for the automatic adjusting of parts of a motor vehicle corresponding to the driver's requirements is known from German Patent document DE 36 09 688 A1. In this known case, the momentary function positions of several seat adjusting elements as well as of an outside mirror adjusting element are stored through the operation of a storage key after a previous activation of a user identification switch specifically for this respective user. When subsequently a user activates the identification switch assigned to him, the different seat adjusting elements as well as the outside-mirror adjusting element, by means of the activating of corresponding actuators, each simultaneously take up their previously stored function position for this user. A similar device having a seat adjusting and outside-mirror adjusting system is described in German Patent document DE 41 28 306 A1. In this system, function information can be stored in a user-specific manner and can be called-in again or selected by way of an assigned operating switch. Additionally, in this case, the operating device is not stationarily mounted in the vehicle.

An arrangement for adjusting the seat position for a person in a vehicle is indicated in German Patent document DE 26 40 528 A1. By way of a keyboard, the operating person can input a personal identification number and a situation code number according to which the computer generates correspondingly dependent output values. These output values, when called, are successively fed to a control device and control the seat adjusting elements into the respective optimal function position determined by the computer.

From German Patent document DE 40 17 895 C1, an arrangement of operating elements of vehicle components is known in which, by operating vehicle component selection keys, one of the vehicle components respectively is switched on, after which a symbolic representation of the functions of the switched-on vehicle component which are to be adjusted takes place on a display. A defined assignment exists of the functions of the vehicle components to be adjusted with respect to the switches. When these switches are actuated, the functions of the vehicle component to be adjusted are switched in a corresponding manner. In this arrangement, all assignments are fixedly determined in an unchangeable manner.

In the non-prior art German Patent document P 43 38 171.5-34, which is a continuation of the above-mentioned arrangement, a keyboard and display system is suggested for operating component functions in a motor vehicle with at least one plane-selection key for selecting a function plane and with function selection keys to which different indicated functions are assigned in the various function planes. In this case, the functions assigned to the function selection keys in the function plane selected by means of the plane-selection key can be predetermined with respect to the individual user. Through the use of these function selection keys, operating switches are therefore implemented by which different function elements can be controlled in the different function planes. In this case, in each function plane, through the activation of an operating switch, the one function element which is assigned to it on the user side is respectively controlled.

The invention is based on the technical problem of providing an adjusting device of the above-mentioned type whose multi-functional operating switch can have its functionality adapted in a very flexible manner to different demand requirements.

This problem is solved by an adjusting device particularly for use in a vehicle, having an operating switch by which several function elements, which can be controlled into different function positions, can simultaneously be controlled into a respective function position which can be predetermined in a variable manner on the user side. The function elements which can be controlled by an operating switch are selected on the user side in a variable manner from a totality of function elements.

The characteristic that the function elements, which can be controlled by the operating switch on the user side, can be selected in a variable manner from a totality of function elements, increases the flexibility of the use of the operating switch. Through the use of the operating switch, not only a fixedly predetermined group of function elements can be controlled jointly into function positions which can be predetermined in a variable manner on the user side, but also the function elements themselves which can be controlled by the user can be selected by the user in a desired manner from a predetermined totality of function elements. Thus, when this device is used in a vehicle, the operating switch can be configured by the user, for example, as a tunnel switch, as a heat accumulation switch, or as a car wash switch. In the first case, the user can select, for example, from the function elements existing in the vehicle, i.e. the window lift mechanisms, a possible adjusting element for a sliding/lifting roof, an air supply filter, the low beam unit, the interior light unit, as well as a radio/cassette component. In the second case, the user may, for example, assign to the operating switch the adjusting element for the sliding/lifting roof, an air-conditioning unit, a fan unit, the window lifting mechanisms and a possible rear roller-blind drive. The third case applies, for example, to the assignment of the window lifting mechanisms, of an antenna drive, of a "dip-stick" drive (retractable side marker for a vehicle to aid parking), of an outside-mirror adjusting unit, of the interior-light unit and of the adjusting element of the sliding/lifting roof to the operating switch. In addition, in each of these three examples, the user, according to his own free choice, can predetermine the function positions of the function elements selected by him for the control by way of the operating switch which are to be taken up by the controlled function elements when the operating switch is activated. Such operating switch configurations can be implemented in a particularly simple manner in vehicles with a cross-linked electronic system of the vehicle.

In a further preferred embodiment of the invention, the operating switch is also used as an operating element for storing the momentary function positions of the selected function elements. The momentary function positions are stored as those function positions which, in the case of a normal activation of the operating switch, are to be taken up by the controlled function elements. This eliminates a separate storage key.

A further embodiment of the present invention is advantageous for cases in which certain presetting carried out by the user with respect to the function elements which can be controlled by way of the operating switch and/or with respect to the function positions to be taken up by them would result in colliding function activations or in other undesirable operating conditions. The latter is prevented by the fact that the adjusting device recognizes such combinations as being unacceptable and blocks their implementation. In this case, the adjusting device is initially informed of the division into acceptable and unacceptable combinations. As required, it may, for example, prevent the simultaneous turning of the radio on and retraction of the antenna, or the activation of the interior heating system and the simultaneous opening of all side windows.

In a further embodiment of the invention the adjusting device, provided in a vehicle, couples the control of certain function elements to assigned vehicle state conditions and blocks the control if these conditions are momentarily absent. Thus, for example, the retraction of the outside mirror because of an unintentional activation of the operating switch can be prevented during the drive in that this retraction is linked to a condition where the vehicle speed is equal to or almost zero.

Other objects, advantages and novel features of the present invention will become apparent from the following detailed description of the invention when considered in conjunction with the accompanying drawings.

DETAILED DESCRIPTION OF THE DRAWING

Figure 1:
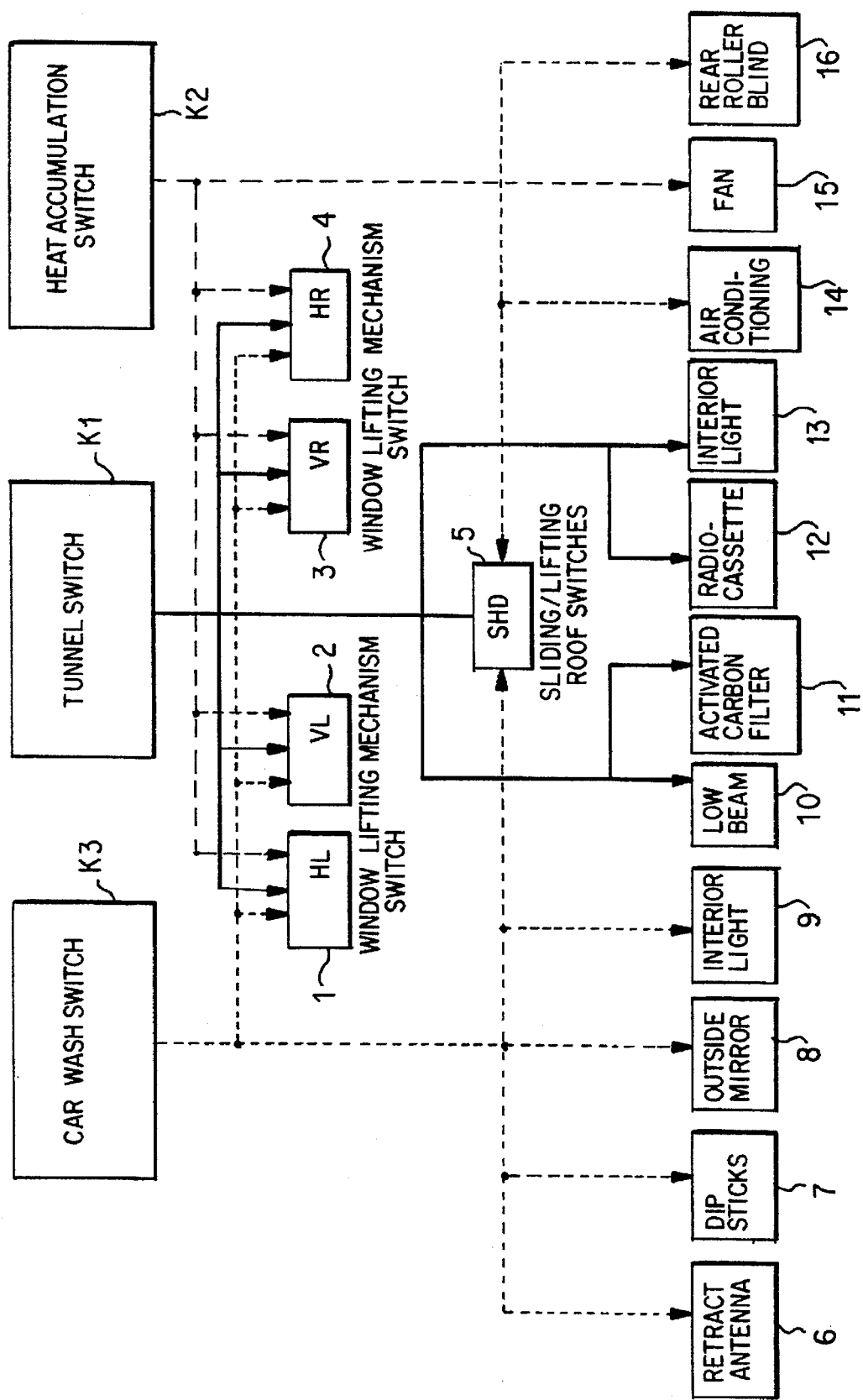
FIG. 1 shows a block diagram of an adjusting device for a motor vehicle with three possible operating switch configurations.

FIG. 1 illustrates three possible configurations for an operating switch (K1, K2, K3) of an adjusting device provided in a motor vehicle (not shown) which can be freely determined by a user for several function elements. The three possible configurations are, specifically, a first configuration as a tunnel switch (K1), a second configuration as a heat accumulation switch (K2) and a third configuration as a car wash switch (K3). The operating switch (K1, K2, K3) may, for example, in a manner not shown in detail, be implemented in addition to conventional operating switches in the center console area of the motor vehicle as a rocker switch. The operating switch can be freely programmed by the user with respect to a control of one or several function elements from a totality of function elements composed of all of the function elements which exist in the vehicle. The operating switch can be controlled individually by way of respective pertaining operating switches into different function positions. As illustrated in FIG. 1, the three above-mentioned operating switch configurations include the following function elements: one window lifting mechanism 1, 2, 3, 4 respectively for the left rear (HL), the left front (VL), the right front (VR) and the right rear (HR) vehicle door, a sliding/lifting roof drive 5, an antenna control element 6, control elements for fuel dip sticks 7, an outside-mirror control element 8, a first interior-light unit 9, a low-beam unit 10, an activated carbon filter 11 for filtering supplied air, a radio/cassette component 12, a second interior-light unit 13, an air-conditioning unit 14, a fan 15, and a rear roller blind control element 16. As mentioned above, all of the function elements 1 to 16 can be activated individually by the user by means of conventional operating switch elements.

During vehicle operation, situations typically occur which, for adapting the vehicle to the situation, require or make desirable the activation of several of these function elements. Thus, when driving through a tunnel, it is desirable for all windows as well as the sliding roof to be closed and for the activated carbon filter as well as the low beam to be switched on, for the radio/cassette component not to be set to radio operation, and for the interior light to be switched on in a dimmed manner. Thus, when controlling the corresponding function elements through the use of the individual operating switches for adjusting this vehicle condition, eight differently arranged operating switches would have to be serially activated. By means of the operating switch in the tunnel-switch configuration (K1), which can be freely configured, this goal can be achieved by merely activating this operating switch which was previously programmed to be suitable for use as a tunnel switch (K1).

This operating switch programming takes place in that the operating switch is first brought into a query position. The query position is implemented, for example, by a slight touch. In the query position, the momentarily stored functionality, that is, which function element can currently be controlled by it and into which function position this takes place in each case, is displayed, for example, on a display of a combination instrument. As desired, through the use of the combination instrument, additional function elements can then be selected for control by the freely configurable multi-functional operating switch. Conversely, a selected function element can be uncoupled again or removed from control by this operating switch. After the function elements, which are assigned to the operating switch in the desired functionality, for example, the tunnel driving function, were selected by the user in this manner, the user brings these selected function elements once into the respective function position which is desired for the required functionality. For example, for the tunnel driving function, the above-mentioned function elements (1 to 5, 10 to 13) are activated by way of their pertaining conventional operating switches. That is, in the tunnel driving function, all windows as well as the sliding/lifting roof are closed, the low beam and the activated carbon filter are switched on, the radio operation is deactivated, and the interior light is switched on in a dimmed manner. Then the user activates the multi-functional operating switch in a storage or learning position, for example, by a rocking in the upward direction and holding for a predetermined time period in order to store these function positions. This storing or learning phase for the operating switch is visually displayed to the user, for example, by an LED (not shown) in the operating switch itself or by a corresponding display in the combination display unit (not shown). As soon as the learning phase is concluded, the optical display will be extinguished and the user can then release the operating switch. The desired functionality is now stored in the adjusting device.

Figure 2:
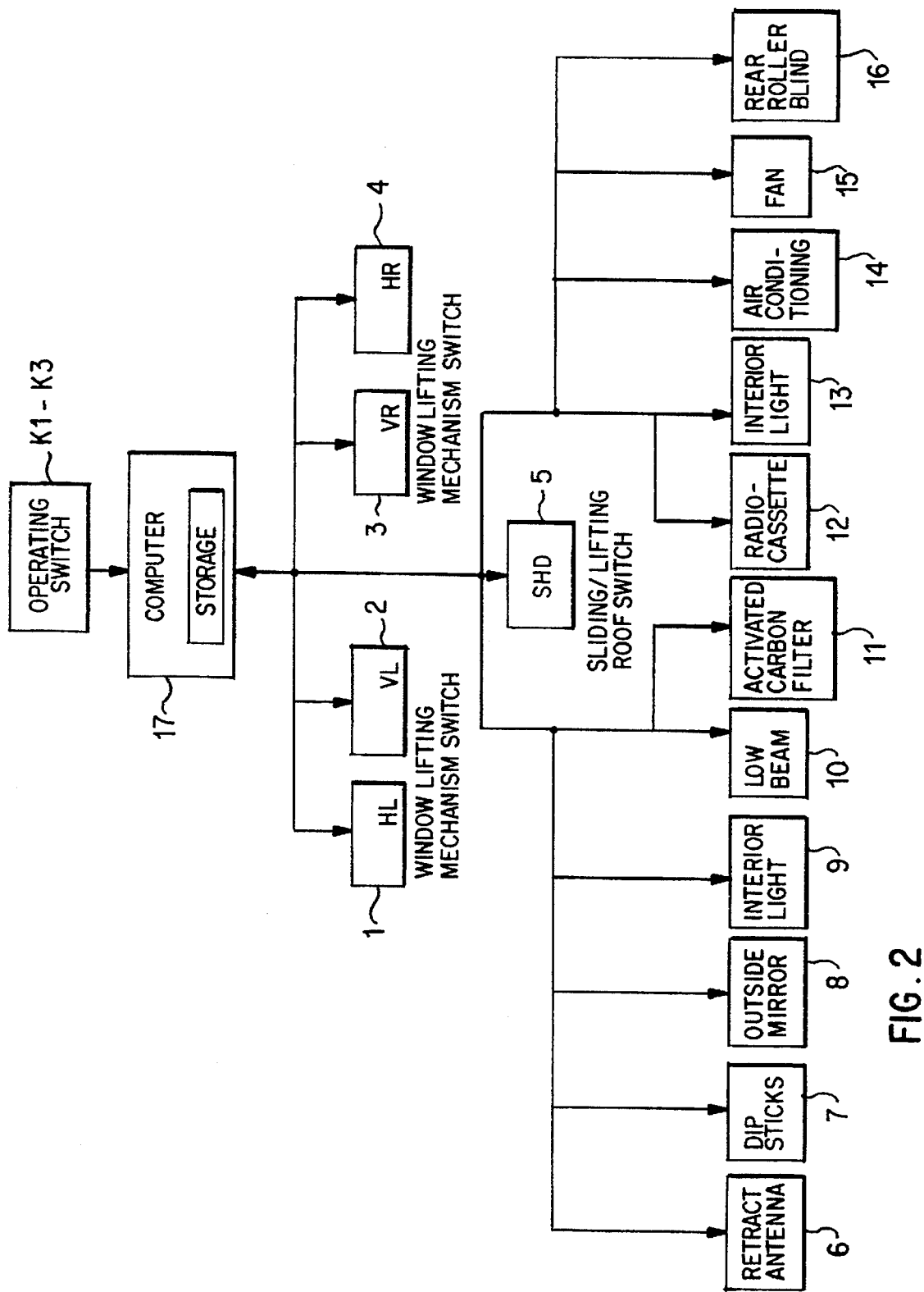
FIG. 2 is a block diagram of an adjusting device for a motor vehicle showing the computer and bus structure.

As soon as the user activates the tunnel switch configured operating switch (K1) into its control position, for example, when the rocking switch is implemented by a downward rocking, the selected function elements are simultaneously controlled into the stored function positions, as indicated in the figure by the solid lines. When the vehicle drives into a tunnel, the driver must therefore only activate the one operating switch programmed as a tunnel switch (K1) rather than eight individual operating switches in order to bring the vehicle into the desired tunnel driving condition. This represents a significantly higher operating comfort. Further, the driver's attention is not diverted from the traffic situation by the annoying activation of many operating switches. Referring to FIG. 2, it is understood that the adjusting device for storing the function elements to be controlled in each case by the operating switch and the function positions to be respectively taken up by them, as well as for the control of the function elements upon a corresponding activating of the operating switch, contains suitable computer 17 and control apparatus units which are of a conventional type and therefore do not have to be described in detail. One skilled in the art can readily program such conventional computer and control apparatus units to perform as described herein.

The variable controllability of a plurality of function elements from the totality of function elements 1 to 16 is further permitted by the fact that the motor vehicle has a conventional electronic and control apparatus cross-linking, such as a CAN-bus (see FIG. 2). An open system architecture permits linking the most different function elements with the multi-functional operating switch corresponding to the user's desire. Preferably, information concerning acceptable and unacceptable combinations of function elements and their function positions for the common control is first fed to the adjusting device by way of the operating switch in order to prevent faulty programming operations by the user from resulting in inappropriate combinations of function positions of certain function elements.

In addition to the above-described tunnel driving functionality (K1), the figure shows, as examples, two additional advantageous configuration possibilities for the operating switch. In the configuration as a heat accumulation switch (K2), the operating switch, as illustrated in the figure by means of broken lines, controls all window lifting mechanisms 1 to 4, the sliding/lifting roof 5, the air-conditioning unit 14, the fan 15 and the rear roller-blind 16. The pertaining function positions are selected such that the heat accumulation is counteracted; that is, when the operating switch in the configuration of the heat accumulation switch (K2) is activated, all windows as well as the sliding/lifting roof are opened up; the air-conditioning unit is adjusted to full cooling; the fan is adjusted to maximal ventilation and the rear roller-blind 16 is lowered.

As a third case shown, the operating switch has the configuration of a car wash switch (K3). In this case, as illustrated by a dotted line in the figure, the operating switch (K3) controls all window lifting mechanisms 1 to 4, the antenna 6, the dip sticks 7, the outside mirror 8, the first interior-light unit 9 and the sliding lifting roof 5. For achieving the vehicle condition desired for the car wash function, the function positions of these function elements 1 to 9 are selected such that, when the operating switch is activated as a car wash switch (K3), all windows as well as the sliding/lifting roof are closed; the antenna and the dip sticks are retracted; the outside mirror is retracted; and the interior light is switched on in a dimmed manner.

For these additional functionalities of the operating switch, it is also clear that the operating comfort is increased considerably. This is because in the case of the heat accumulation function, again eight function elements, and in the case of the car wash function, even nine function elements, can be controlled jointly by the programmed operating switch. If it is desired that the user has two or more functionalities in parallel available in the vehicle, without having to newly program the operating switch, naturally a corresponding number of such multi-functional operating switches may be provided which can be configured freely. As an alternative, it is also possible to allocate different functionalities to the same operating switch among which the user can choose by the cyclical calling of these functionalities, the functionality which is currently desired by him, such as tunnel driving or heat accumulation or car wash.

Furthermore, the adjusting device provides a linking of the control of safety-relevant function positions of the function elements with additional input parameters representing the momentary vehicle condition. This therefore prevents the concerned function from being carried out in the case of an unintentional activation of the operating switch which otherwise may possibly endanger the safety of the occupants. Thus, the adjusting device, for example, links the retracting of the outside mirror requested by means of the activating of the multi-functional operating switch to the condition that the momentary vehicle speed is equal to or at least close to zero.

It is clear that the adjusting device according to the present invention is not limited to the described use in vehicles but can be used for achieving a higher operating comfort wherever the requirement exists of being able to adjust several selectable function elements of a totality of function elements with respect to their function simultaneously and in an adapted manner to a certain existing situation exists.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adjusting device for function elements used in a vehicle, comprising:

an operating switch for simultaneously controlling several of said function elements into a respective function position that is predetermined in a variable manner by a user, said several function elements each being controllable into different function positions;

wherein said several function elements which can be controlled by said operating switch are selected by the user in a variable manner from a totality of said function elements.

2. The adjusting device according to claim 1, wherein via said operating switch, a storage function is activated in which momentary function positions of said several function elements being simultaneously controllable through the use of said operating switch are stored in a memory as function positions which are simultaneously adjusted by said operating switch.

3. The adjusting device according to claim 2, wherein possible combinations of said several function elements selected for the operating switch and of function positions of said selected function elements that are adjusted via said operating switch, are divided into acceptable and unacceptable combinations, said adjusting device blocking the activation of said unacceptable combinations.

4. The adjusting device according to claim 3, wherein said adjusting device blocks a control of certain function elements after an activation of said operating switch if one of a momentary value and momentary values of one or more detected vehicle condition quantities falls outside of a predetermined permissible range.

5. The adjusting device according to claim 2, wherein possible combinations of function positions of said selected function elements that are adjusted via said operating switch are divided into acceptable and unacceptable combinations, said adjusting device blocking the activation of said unacceptable combinations.

6. The adjusting device according to claim 1, wherein possible combinations of said several function elements selected for the operating switch are divided into acceptable and unacceptable combinations, said adjusting device blocking an activation of said unacceptable combinations.

7. A method for operating an adjusting device in a vehicle for several function elements which are each controlled into different function positions, the method comprising the steps of:

selecting with an operating switch a variable set of said several function elements by a user from a totality of said several function elements; and simultaneously controlling said set of said several function elements into a respective function position that is predetermined in a variable manner by the user.

8. The method according to claim 7, further comprising the step of:

activating a storage function via said operating switch in which momentary function positions of said set of function elements selected as being simultaneously controllable via said operating switch are stored as function positions that are simultaneously adjusted via said operating switch.

9. The method according to claim 8, further comprising the step of:

dividing possible combinations of said function elements selected for said operating switch into acceptable and unacceptable combinations; and blocking any activation of said unacceptable combinations of said function elements or function positions.

10. The method according to claim 9, further comprising the step of:

after an activation of said operating switch, blocking a control of certain function elements if a momentary value or values of one or more detected vehicle condition quantities falls outside a predetermined permissible range.

11. The method according to claim 8, further comprising the step of:

dividing possible combinations of function positions of the selected function elements adjusted via said operating switch into acceptable and unacceptable combinations; and blocking any activation of said unacceptable combinations of said function elements or function positions.

12. The method according to claim 11, further comprising the step of:

after an activation of said operating switch, blocking a control of certain function elements if a momentary value or values of one or more detected vehicle condition quantities falls outside a predetermined permissible range.

* * * * *